United States Patent
Banerjee et al.

(10) Patent No.: US 7,503,037 B2
(45) Date of Patent: Mar. 10, 2009

(54) SYSTEM AND METHOD FOR IDENTIFYING BUGS IN SOFTWARE SOURCE CODE, USING INFORMATION FROM CODE COVERAGE TOOLS AND SOURCE CONTROL TOOLS TO DETERMINE BUGS INTRODUCED WITHIN A TIME OR EDIT INTERVAL

(75) Inventors: Ashok Banerjee, Fremont, CA (US); Michael Cico, Nashua, NH (US); Vishal Vishnoi, Burlington, MA (US)

(73) Assignee: Bea Systems, Inc., Redwood Shores, CA (US)

( * ) Notice: Subject to any disclaimer, the term of this patent is extended or adjusted under 35 U.S.C. 154(b) by 912 days.

(21) Appl. No.: 10/816,615

(22) Filed: Apr. 2, 2004

(65) Prior Publication Data

US 2005/0223357 A1   Oct. 6, 2005

(51) Int. Cl.
*G06F 9/44* (2006.01)
(52) U.S. Cl. ......................................... 717/124; 717/120
(58) Field of Classification Search .......... 717/124–133
See application file for complete search history.

(56) References Cited

OTHER PUBLICATIONS

Rational PureCoverage Quick Reference, pp. 1-8, 2001.*
Web Management with Microsoft Visual SourceSafe 5.0, 1997, pp. 99-101.*

* cited by examiner

*Primary Examiner*—Michael J Yigdall
(74) *Attorney, Agent, or Firm*—Fliesler Meyer LLP (57) ABSTRACT

A system and method for using an automated process to identify bugs in software code. The system can be used to assist with the development of large and complex software products. File-level and/or line-level code coverage information is used to automatically trace-test failures to development changes within the product source code over a specified period of time. Information as to the health of a software product and the test criteria it passes or fails is compared at a first time, when the product may have satisfied all test criteria, with the health of the product at a second time when the same criteria may be failing. This information can then be used to narrow down and/or identify specific product failures to a particular change or set of changes in the software code, before any manual analysis need be done.

25 Claims, 12 Drawing Sheets

```
/**
 * computes the price for the order.
 *
 * @return a <code>float</code> value
 * @exception SnailMailException if an error occurs
 */
public float computePrice() throws SnailMailException {
    float price = 0.00f;

price = 3 * model.getWeight();

if (model.getService().equals(Service.ECONOMY)) {
        price = price * 0.80f;
    } else if (model.getService().equals(Service.STANDARD)) {
        price = price * 1.50f;
    } else if (model.getService().equals(Service.EXPRESS)) {
        price = price * 4.00f;
    } else {
        throw new SnailMailException("Service: " + model.getService() +
            "not supported");
    }

} // if..
    // buggy code that changes the price
    price = price * 1.12f;

return price;
} // M - computePrice
```

122 — $ p4 describe 284624
Change 284624 by vvishnoi@vvishnoi.portvishal on 2003/08/14 08:51:53

Bug introduced by Snail Mail developer in the pricing logic. This will cause the Price test to fail.

Affected files ...

124 — ... //depot/dev/sandbox/vvishnoi/tools/faultFinder/test/bugInspector/application/snailMail/pricing/Price.java#2 edit Differences ...

126 — ==== //depot/dev/sandbox/vvishnoi/tools/faultFinder/test/bugInspector/application/snailMail/pricing/Price.java#2 (text) ====

35a36,38
>
>
>
128 — $ |

// buggy code that changes the price
price = price * 1.12f;

FIG. 9

```
public void testPrice() {
    try {
        PriceModel model = new PriceModel(Service.EXPRESS, 5.00f);
        Price price = new Price(model);
        float cost = price.computePrice();
        this.assertEquals(60.00f, cost, 0.00f);
    } catch (Exception e) {
        log.log(Level.INFO, "test failed", e);
        fail("test failed with exception: " + e);
    } // try...
} // M - testOrder
```

FIG. 10

```
ff.bi.client.root=c:/weblogic
ff.bi.relative.source.path=dev/sandbox/vvishnoi/tools
ff.bi.coverage.dir=c:/weblogic/dev/sandbox/vvishnoi/tools/faultFinder/test/
bugInspector/application/snailMail/test/testruns/second
ff.bi.output.dir=c:/weblogic/dev/sandbox/vvishnoi/tools/build/faultFinder/
gjtk/bireport
ff.bi.query.type=change
ff.bi.query.param.from=284600
ff.bi.query.param.to=284650
ff.bi.date.pattern=MM/dd/yyyy
```

SYSTEM AND METHOD FOR IDENTIFYING BUGS IN SOFTWARE SOURCE CODE, USING INFORMATION FROM CODE COVERAGE TOOLS AND SOURCE CONTROL TOOLS TO DETERMINE BUGS INTRODUCED WITHIN A TIME OR EDIT INTERVAL

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention is related generally to software development systems and particularly to a system and method for using an automated process to identify bugs in software source code.

BACKGROUND

Modern computing systems often utilize large-scale and/or complex software systems. Typical examples of these software systems include operating systems, application servers, and other complex software applications. A key factor in developing and successfully marketing a complex software application is maintaining the quality of that application through a process of quality control. This typically includes tracking and fixing any inconsistencies, faults, or "bugs" that arise in the software code during the development process. In most companies the quality control activity is the responsibility of a Quality Assurance (QA) team. Software fault analysis is often one of the more costly endeavors of the QA cycle of a product, both in terms of human and machine resources. Particularly on large and complex software products defects can take hours or days to track down, often requiring 30%-40% of the QA teams efforts. Any system which can be used to speed up the bug identification and resolution process can lead to great improvements in development time and produce economic efficiencies for the company.

SUMMARY

In accordance with an embodiment of the present invention, a system (referred to as "BugInspector") is provided which addresses the issue of software bug identification and resolution. The system can be used to assist with the development of large and complex software products. File-level and/or line-level code coverage information is used to automatically trace-test failures to development changes within the product source code over a specified period of time. Information as to the health of a software product and the test criteria it passes or fails is compared at a first time ("yesterday"), when the product may have satisfied all test criteria, with the health of the product at a second time ("today") when the same criteria may be failing. This information can then be used to narrow down and/or identify specific product failures to a particular change or set of changes in the software code, before any manual analysis need be done. The result is an overall shortening in the product failure analysis time. In some embodiments the system is designed to be extensible, and may be adapted to work with or use a variety of existing source code management systems, code testing systems, and code coverage analysis systems.

DETAILED DESCRIPTION

In accordance with an embodiment of the present invention, a system (referred to as "BugInspector") is provided which addresses the issue of software bug identification and resolution. The system can be used to assist with the development of large and complex software products.

Within any large software corporation such as BEA Systems, which develops complex software systems such as WebLogic Server, over the course of an average day several hundred (e.g. 300 changes) may be introduced into the software code. If a test fails, then any one of the 300 changes is a suspect. Using BugInspector the quality assurance (QA) team is able to reduce the suspect changes down to a more manageable 10-20. In some instances the suspect changes can be as narrowed to as few as 1-5. By then looking at the failure log, and the BugInspector suspected changes, the QA specialist can easily figure out the change that introduced the problem.

Figure 1:
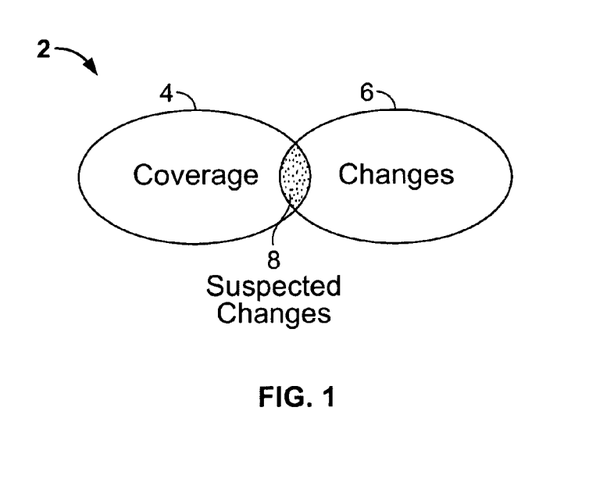
FIG. 1 illustrates an overview of how the BugInspector methodology works in accordance with an embodiment of the invention.

FIG. 1 illustrates an overview of how the BugInspector methodology works. The coverage 4 (from a coverage report) shows all of the code files that were touched/covered by the failed test. Changes 6 (as reported from a source code management (SCM) system) shows all of the files that were changed within, e.g. the last 24 hours. The intersection 8 of these sets represents the set of suspected file/changes that caused the test to fail, the reasoning being that only those files that were changed within the specified time period (e.g. those last 24 hours) could have caused the test to fail.

In the context of this document, the term "code coverage" refers to the general concept of identifying which parts of a software product's source code is being exercised during a particular execution cycle (typically whenever the QA tests for a particular product are executed against that product). Typically, a tool is used to inject software instructions (referred to as "instrumentation") into the target software code, either into the high-level source code (i.e. the actual Java, C++, Fortran, etc. source code) or at the binary level (Java bytecode level, native assembly language, etc.). The instrumentation that is inserted into the software product tracks which lines, branches, and/or methods are getting executed, and then stores this information onto a secondary storage media as it is executed. The resulting "coverage data" can then be used to generate reports that show where the target software needs to have more testing performed, for example.

Coverage can be gathered at several levels, including line, branch, or method. Method-level coverage indicates which methods, or functions, of the target software are being invoked during an execution cycle. With branch-level coverage the target software is analyzed and broken into the different execution paths that are possible through each method or function. Each flow-control construct (i.e. conditionals and looping constructs, for example), is analyzed to determine what the total number of "paths" or "branches" are possible through the target code. The coverage data is an indication of which branches were actually executed or not. With line-level coverage, for every line of source code that represents an executable statement, instrumentation is inserted to track which lines were executed or not. While "branch" level coverage is considered to be a more accurate indicator of product quality, line-level coverage is often chosen for it's simplicity, and the fact that it's easier for individuals (both QA specialists and software developers) to understand.

In accordance with the present invention, an underpinning of the BugInspector technology is the ability to map code coverage data to individual QA tests for a product. The code coverage data is stored on a per-test level, so after exercising a suite of tests with code coverage instrumentation, the QA team can gain an understanding of which lines of source code for a target software system are being exercised by an individual test. While line-level information can be used to determine the most accurate intersection of tests to product source code, file-level information is typically accurate enough for identifying changes that have introduced defects into a software product. Here, the term "file-level" indicates the coarser-grained information derived from the line-level code coverage data as to which source-code files, instead of which lines, have been touched by a particular test. This is also easier to map to change information received from the SCM system.

In accordance with an embodiment of the invention, file-level and/or line-level code coverage information is used to automatically trace-test failures to development changes within the product source code over a specified period of time. Information as to the health of a software product and the test criteria it passes or fails is compared at a first time ("yesterday"), when the product may have satisfied all test criteria, with the health of the product at a second time ("today"). This information can then be used to narrow down and/or identify specific product failures to a particular change or set of changes in the software code, before any manual analysis need be done. The result is an overall shortening in the product failure analysis time. In some embodiments the system is designed to be extensible, and may be adapted to work with or use a variety of existing source code management systems, code testing systems, and code coverage analysis systems.

In accordance with an embodiment, the invention allows for the integration of several normally disparate sets of test technologies and tools, including for example:

Test execution and reporting (TER) frameworks;
Source code management (SCM) systems; and,
Code coverage analysis (CCA) tools.

In accordance with an embodiment, the integration of these disparate technologies is made possible via a bug inspection system that includes a plugin framework. The plugin framework in turn provides a set of consistent yet tool-agnostic data models and interfaces, that abstract the fault analysis logic from the underlying toolsets. These interfaces are then realized by concrete implementations that populate the tool-agnostic data models via the actual software development and testing tools that are used by a particular company or organization. This allows testing technologies to be combined, even though some may operate at a file level, and others at a line level. The plugin framework makes it possible, for example, to simultaneously use test-level code coverage information from the CCA tools, and line-level product changes from the SCM system, such that for a particular software test case a set of coverage data can be obtained that represents the subset of product source codes that are actually exercised by that particular test.

Bug Inspection Framework Architecture

Figure 2:
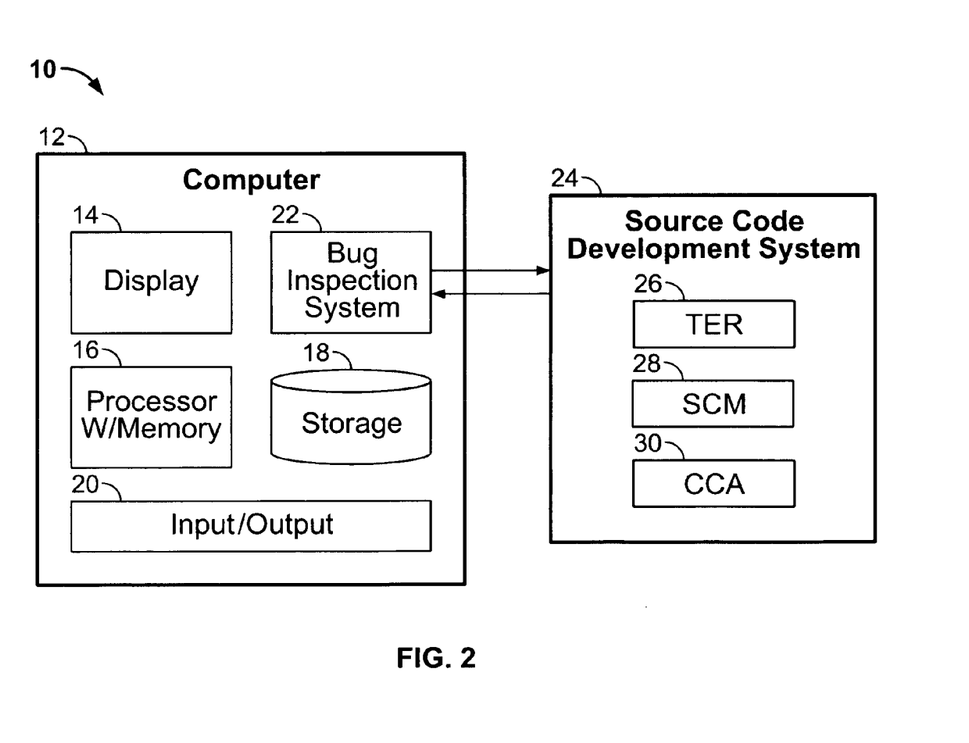
FIG. 2 shows a logical overview of a system in accordance with an embodiment of the invention.

FIG. 2 shows a logical overview of a system in accordance with an embodiment of the invention. As shown in FIG. 2, the system 10 includes a computer 12, including a display device 14, processor 16, storage means 18 and input-output device(s) 20. An implementation of the bug inspection system 22 executes on the computer. The computer typically has access to a source code development system 24, including any tools that may be used within the company for source code development. These tools may include test execution and reporting (TER) frameworks 26; source code management (SCM) systems 28; and code coverage analysis (CCA) tools 30. Other tools and modules may be added. The system can be used by an operator, such as a QA specialist, to identify source code builds that are to be automatically inspected for potential bugs. This selection process is typically performed by the operator specifying a range of change codes, or dates, to the bug inspection system, over which the source code will be checked. The results of the source code checking can then be output to the display device or any other form of output device, for subsequent use in QA.

Figure 3:
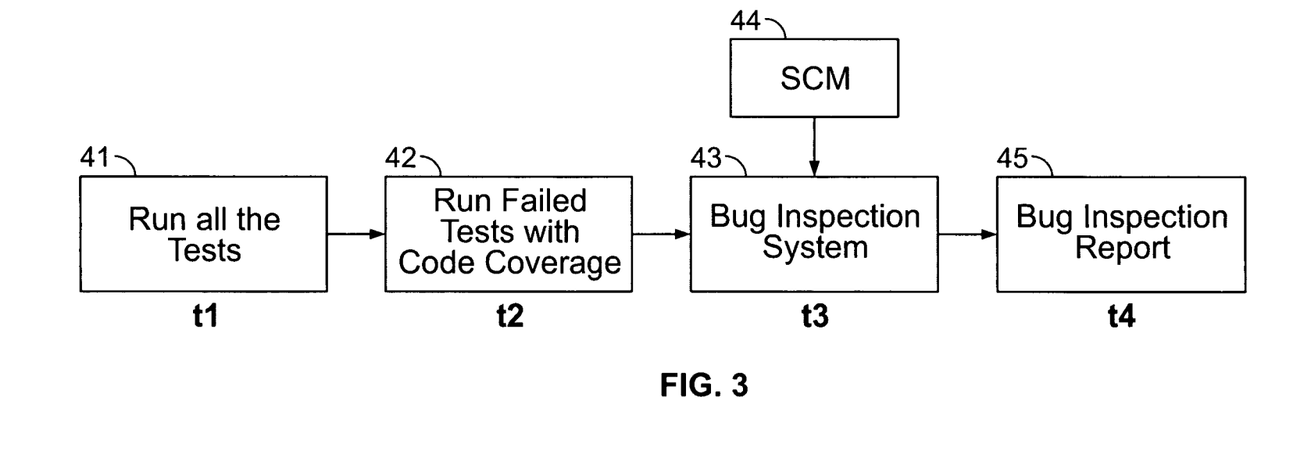
FIG. 3 illustrates an overview of the bug inspection process in accordance with an embodiment of the invention.

FIG. 3 illustrates an overview of a bug inspection process in accordance with an embodiment of the invention. A typical complex software project is re-compiled or "built" at the end of each workday to take into account changes to the source code during that day, so it is common for companies to check for bugs on a daily basis, however the inspection process can be run for any specified period of time or alternatively for any specified range of software code changes. As shown in FIG. 3, a series of the tests are run on the code 41 at time t1. The failed tests are identified and then run at time t2 with code coverage 42. In accordance with an embodiment this code coverage report is generated at the file/line level using information from a code coverage database. At time t3, the BugInspection system 43 uses the code coverage report and information received from the SCM 44 to figure out the suspected changes. The result of the BugInspection is then output in the form of a BugInspection report 45 at time t4. Using failure information and test-to-source coverage mapping the system can be used to identify suspect changes over a period of time.

Figure 4:
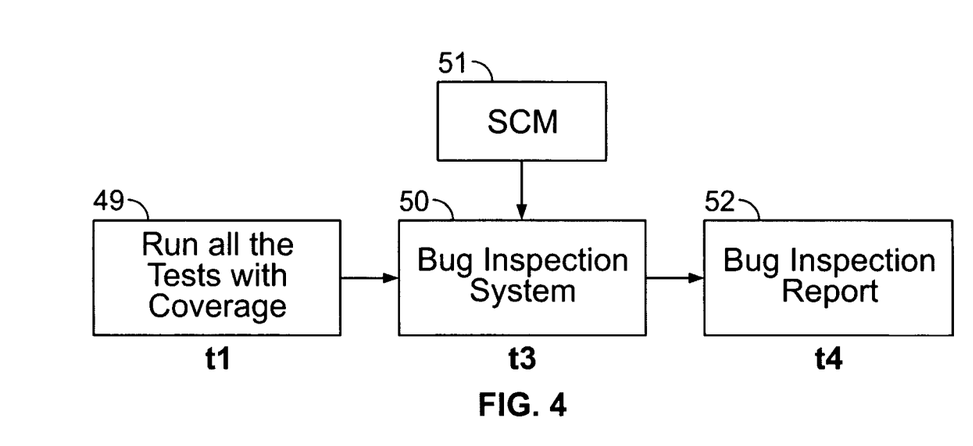
FIG. 4 illustrates an overview of an alternate bug inspection process in accordance with an embodiment of the invention.

FIG. 4 illustrates an overview of an alternate bug inspection process in accordance with an embodiment of the invention. As shown in FIG. 4, a variation of the above process is to run all of the tests with coverage 49 at time t1. At time t3, the BugInspection system 50 uses the code coverage report and information received from the SCM 51 to figure out the suspected changes. The result of the BugInspection is similarly then output in the form of a BugInspection report 52 at time t4.

Figure 5:
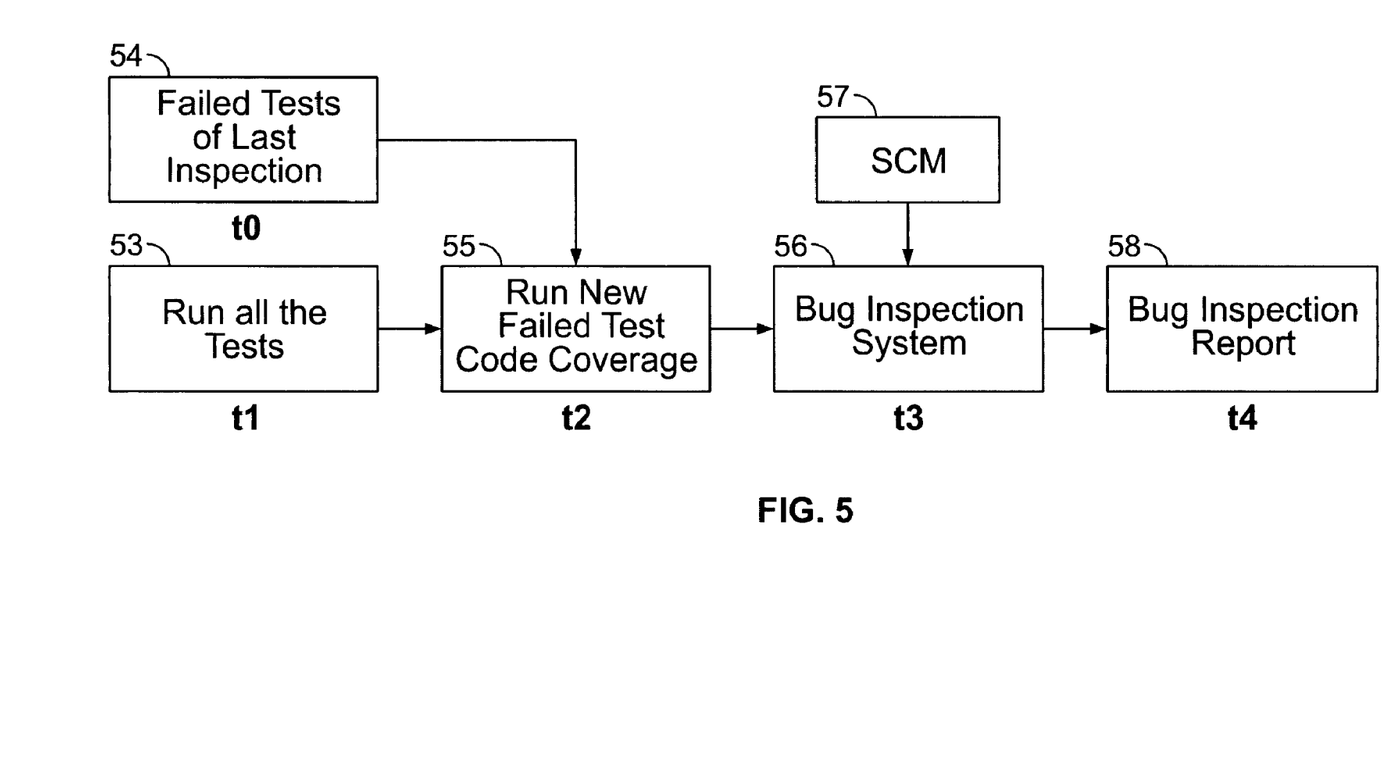
FIG. 5 illustrates an overview of an alternate bug inspection process in accordance with an embodiment of the invention.

FIG. 5 illustrates an overview of an alternate bug inspection process in accordance with an embodiment of the invention. As shown in FIG. 5, another variation is to run only the new failures with code coverage at time t2. This adds to the complexity of the process, and requires archiving of an earlier test run. A series of the tests are run on the code 53 at time t1. Time t0 represents the failed tests that were run in the last inspection 54. At time t2, the results of t1 and t0 are used to determine the new failures, and then run only the new failures with code coverage 55. At time t3, the BugInspection system 56 uses the code coverage report and information received from the SCM 57 to figure out the suspected changes. The result of the BugInspection is similarly then output in the form of a BugInspection report 58 at time t4. This embodiment removes the burden from the developer to having to identify the new failure, by looking at the new and the last BugInspection report.

Figure 6:
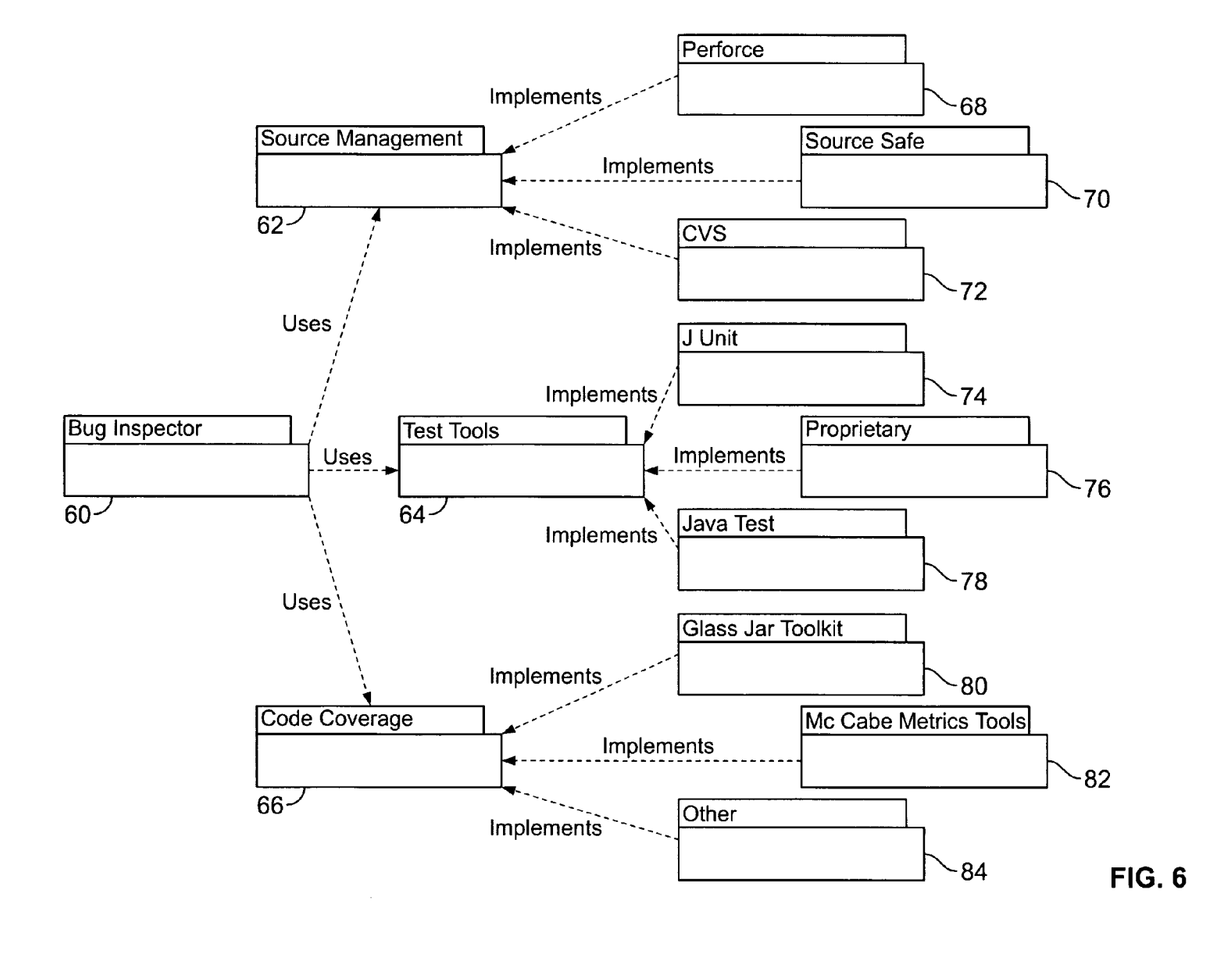
FIG. 6 shows an example of an embodiment of the invention including a plugin framework.

FIG. 6 shows an example of an embodiment of the invention including a plugin framework. As shown in FIG. 6, the framework provides a data model 60 and a set of "provider" interfaces 62, 64, 66 that represent the functionality provided by each type of subsystem (SCM, TER, CCA respectively in this example). These provider interfaces are then realized by a tool-specific implementation that interfaces to a vendor-specific subsystem (68-84). In this manner the bug inspection system can be easily extended to encompass other toolsets. In accordance with one embodiment the system includes interfaces with the Perforce P4 SCM system 68, the Junit test system 74, and the GlassJar Toolkit CCA system 80. Other types of test methodologies may be used instead, depending on the needs of the company, for example, the SourceSafe SCM 70, the CVS SCM 72, proprietary test systems 76, the Javatest test system 78, the McCabe Metrics Tools SCA 82, or other TER's 84.

The test tools need not themselves be a part of the framework, and indeed in some embodiments the test execution and instrumentation processes may occur independently outside the scope of the bug inspection system. The bug inspection system can then use the resultant coverage data from the previously instrumented test run to create the critical change information to be used in fault analysis. In other embodiments some or all of the test tools may be part of the framework, thereby abstracting the entire execution and analysis effort from the underlying TER, CCA, and SCM tools.

Bug Inspection System Implementation

In accordance with one exemplary implementation of the bug inspection system, the system is based on the Java programming language. In accordance with this implementation, the system utilizes the following tools for each test component:

SCM: The "Perforce" source management system by Perforce, Inc.

CCA: The GlassJar Toolkit, a code-coverage analysis tool for the Java programming language by Testers' Edge, Inc.

TER: A BEA proprietary "Blackhawk" test development and execution environment (based on Ant and a variant of Javatest), together with the Junit test framework.

This implementation addresses the needs for interfacing between a CCA system (GlassJarToolkit) and the SCM system (P4). The point at which the bug inspection system (BugInspector) executes is after the tests have been run against software code that is instrumented with "line-level code coverage enabled". Having instrumented code with line-level code coverage enabled allows the QA team to focus on the failure analysis stage and avoid the complexities of test execution and reporting management.

The foregoing description of one exemplary implementation of the present invention has been provided for the purposes of illustration and description. It is not intended to be exhaustive or to limit the invention to the precise forms disclosed. Particularly other TER, CCA, and SCM test tools in addition to, or instead of, those described above may be used as part of the framework.

Bug Inspection Process

Figure 7:
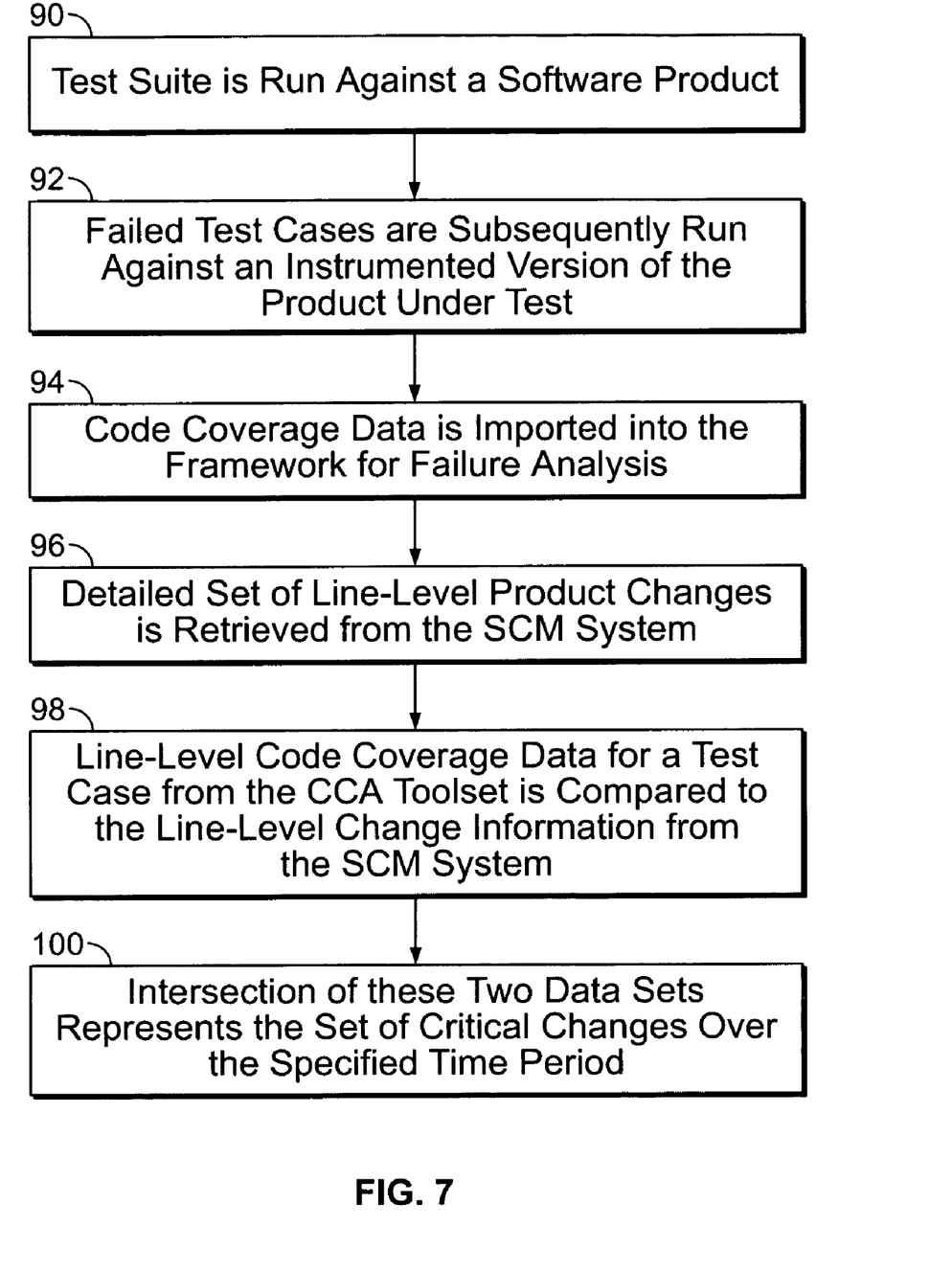
FIG. 7 shows a flowchart of a process in accordance with an embodiment of the invention.

FIG. 7 shows a flowchart of a process in accordance with an embodiment of the invention. As shown in FIG. 7, the bug inspection system allows a process to be executed to determine bugs within the software source code.

In step 90 a test suite is run against a software product (for example using Javatest, Junit, a proprietary test suite, or any other test suite).

In step 92 any failed test cases are subsequently run against an instrumented version of the product under test. (In this context the term "instrumented" refers to product source and/or binary code under test that has been modified to generate line-level code coverage information).

In step 94 the code coverage data is imported into the bug inspection framework for failure analysis.

In step 96 a detailed set of line-level product changes is retrieved from the SCM system (for example Perforce, SourceSafe, CVS, or any other source code management system). Preferably only those product changes over the time interval since the last known successful execution of the test case(s) in question, is retrieved.

In step 98, the line-level code coverage data for a test case from the CCA toolset (for example GlassJarToolkit, McCabe Metrics, or any other code coverage system), is compared to the line-level change information from the SCM system.

In step 100, the intersection of these two data sets (the one from the CCA, and the one from the SCM) represents the set of critical changes over the specified time period. These critical changes represent the most likely candidates as the cause for the product failure.

Any or all of the steps above may be automated by the bug inspection system. Typically the QA operator need only request that the analysis be run over a specific date range, or a range of software code updates, and the system will automatically identify the source code changes within that time frame/range that are most likely responsible for any failure.

Example Use of Bug Inspection System to Check Code

The following section illustrates an example of how the bug inspection system can be used to detect bugs within a small software application, herein referred to as "snailMail". It will be evident that the example shown herein may be extended for use with any software application, and that the invention is not limited to the precise form described.

SnailMail is a package handling company that delivers package by road. The company uses an inhouse software that's used to handle it's operation. The software has three main packages:

Order: Handles the customer order. The customer has to provide the following informaiton to place the order, including their From Address; To Address; Service: express, standard, and economy; Credit Card Number; and Weight. A tracking number is returned on successfully processing the order.

Pricing: Used to compute the price of the order. Computes the price based on Service and Weight. Since SnailMail only handles delivery within the US, it's price does not change based on the from and the address. Once the price is computed, it charges it to the credit card passed in.

Tracking: Used to track the order. Takes the tracking number and returns the current location of the package.

In this example all tests of this software application are written in JUnit and reside in the test package. There are five Junit tests for snailMail, three tests for the Price package, two for the Order package and one for the tracking package.

Figure 8:
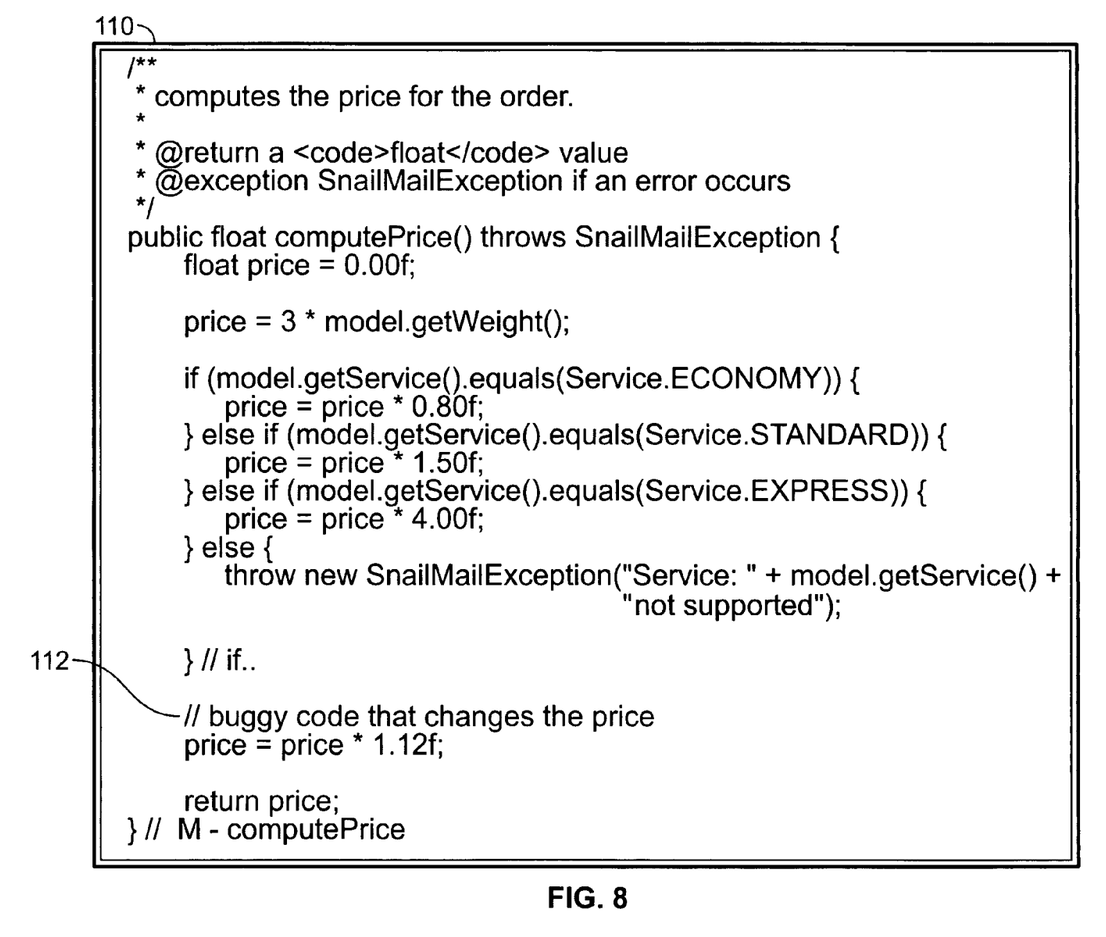
FIG. 8 is an example of a change that introduced a bug into the application.

FIG. 8 is an example of a change that introduced a bug into the application. This change is recorded in the SCM. FIG. 8 shows a sample input source code listing 110 of the compute-price ( ) method in accordance with an embodiment of the invention, as it can be used for fault injection and test failure. By way of example, a fault can be injected into the compute-price ( ) method, as shown in FIG. 8. The fault injection line 112 is the one that has the comment "//buggy code that changes the price" above it. This scenario corresponds to what happens unintentionally in a typical software company as their software code is modified on a daily basis, in many cases simultaneously by many different software programmers.

Figure 9:
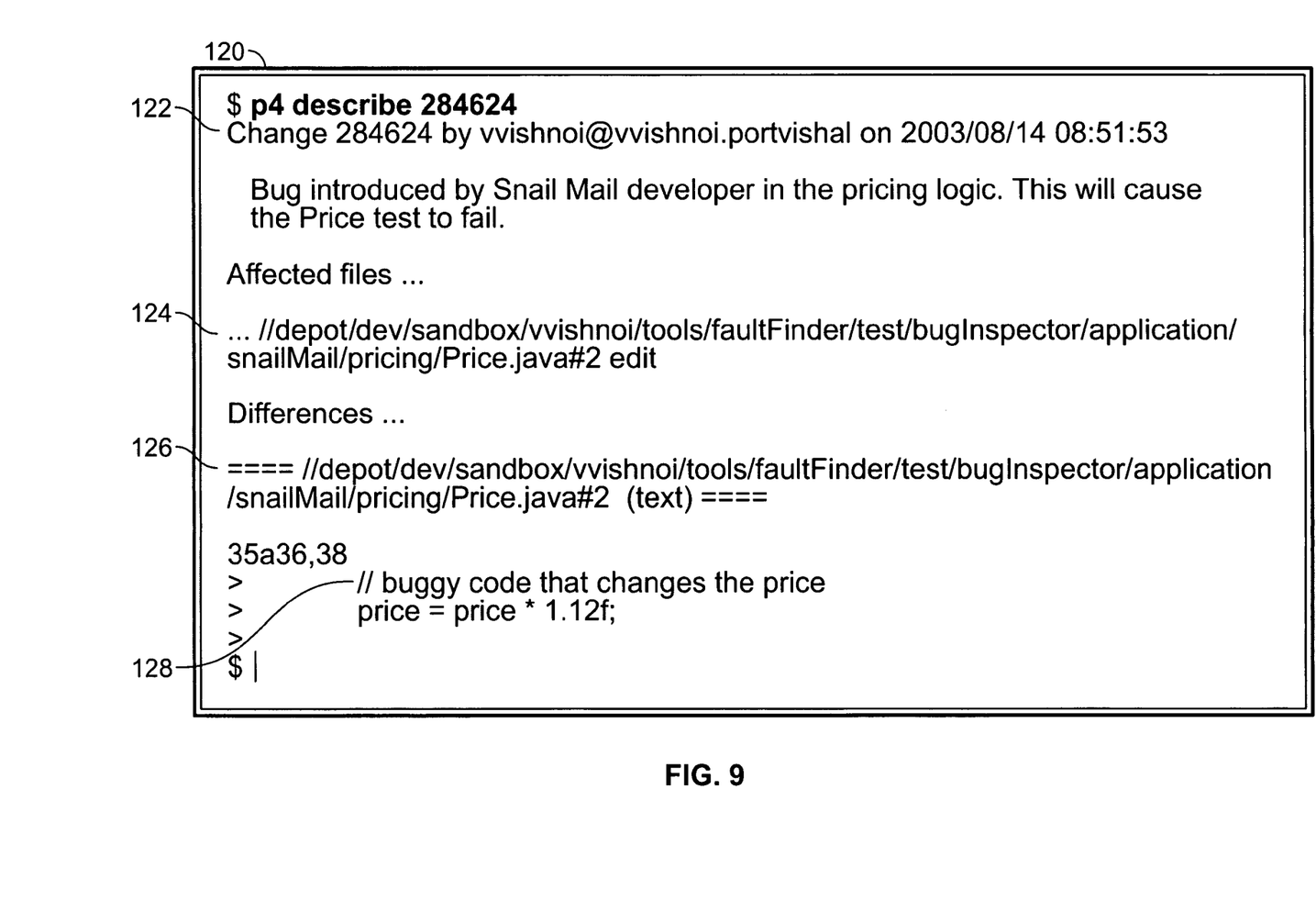
FIG. 9 shows an example of the information about the change that can be retrieved from the SCM

FIG. 9 shows an example of the information about the change that can be retrieved from the SCM. The action in FIG. 8 is done at a time prior to t1. During the software development process a new change number is typically allocated to each change to the software code, and is then tracked by the SCM with that number. In this example, as indicated by the source code management dialog (in this instance Perforce) the change number 122 that introduced the fault is 284624. The system also shows the affected files 124, the differences 126 between the two files, and the suspected buggy code 128.

Figure 10:
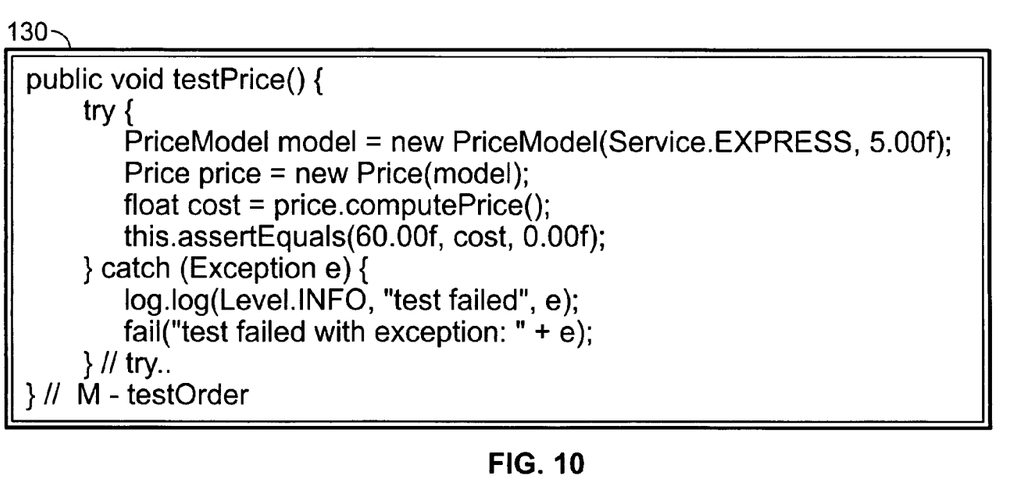
FIG. 10 shows an example of a portion of the test that will fail due to the change made in FIG. 8.

FIG. 10 shows an example of a portion of the test 130 that will fail due to the change made in FIG. 8. This test is run along with other tests at time t1.

Figure 11:
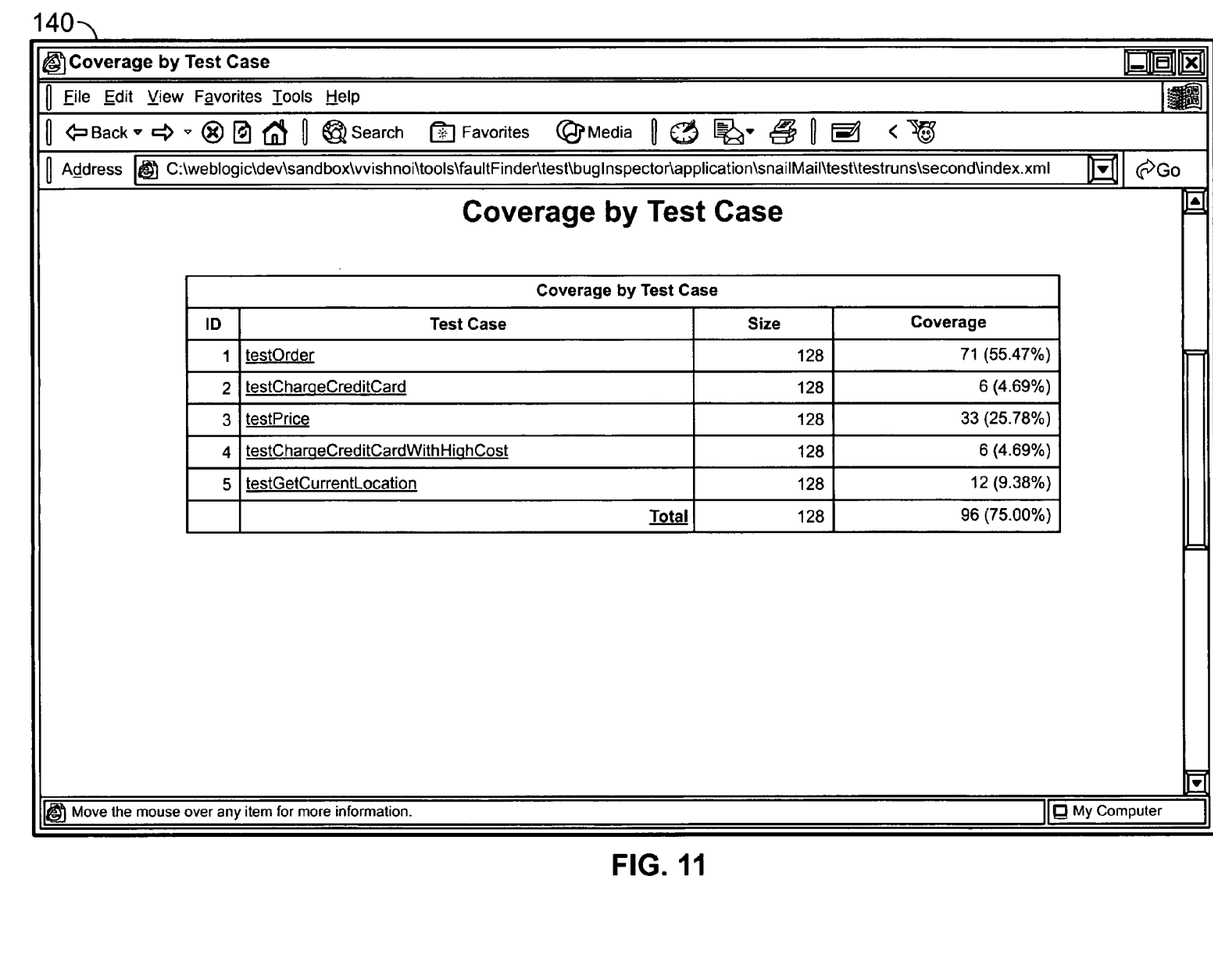
FIG. 11 shows a portion of the code coverage report that is generated at time t1.

FIG. 11 shows a portion of the code coverage report 140 that is generated at time t1. The coverage report is generated for all the tests, and provided to a QA specialist, either as a screen display, or by some other output means.

Figure 12:
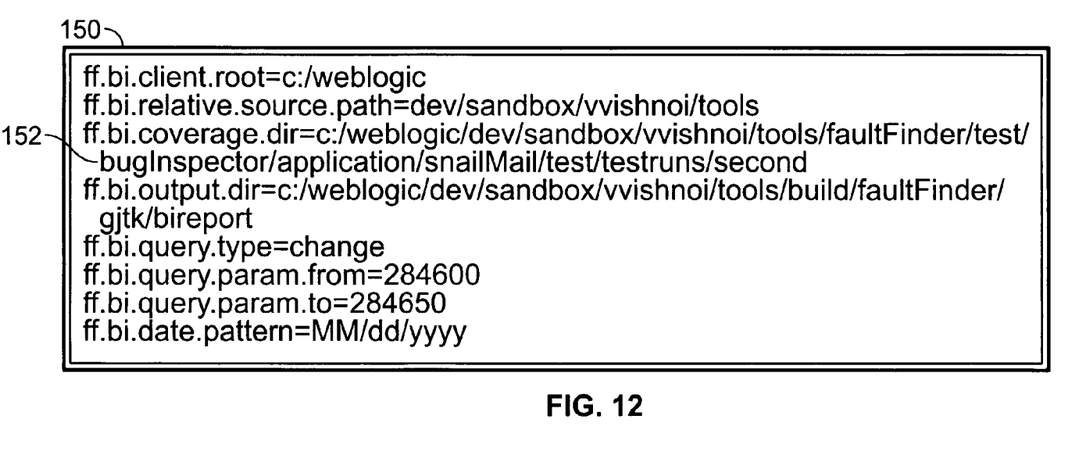
FIG. 12 shows an example of the options that may be passed to the BugInspection system.

FIG. 12 shows an example of the options 150 that may be passed to the BugInspection system. As shown in FIG. 12 'ff.bi.coverage.dir' gives the location of the coverage report generated at time t2. 'ff.bi.output.dir" gives the location where the Bug inspection report should be generated at time t4. 'ff.bi.query.type" is set to 'change', which tells BugInspctor to do the inspection over a change range (i.e. a range of change numbers). The user could have also specified a date range. 'ff.bi.query.param.from' gives the change from which the inspection should start. 'ff.bi.equry.param.to' gives the change till which the inspection is performed. This procedure determines the code coverage over which the bug inspection will automatically analyze for software bugs, and replaces the traditional manual QA process whereby an operator might have to separately analyze each change for its effect on the software code.

Figure 13:
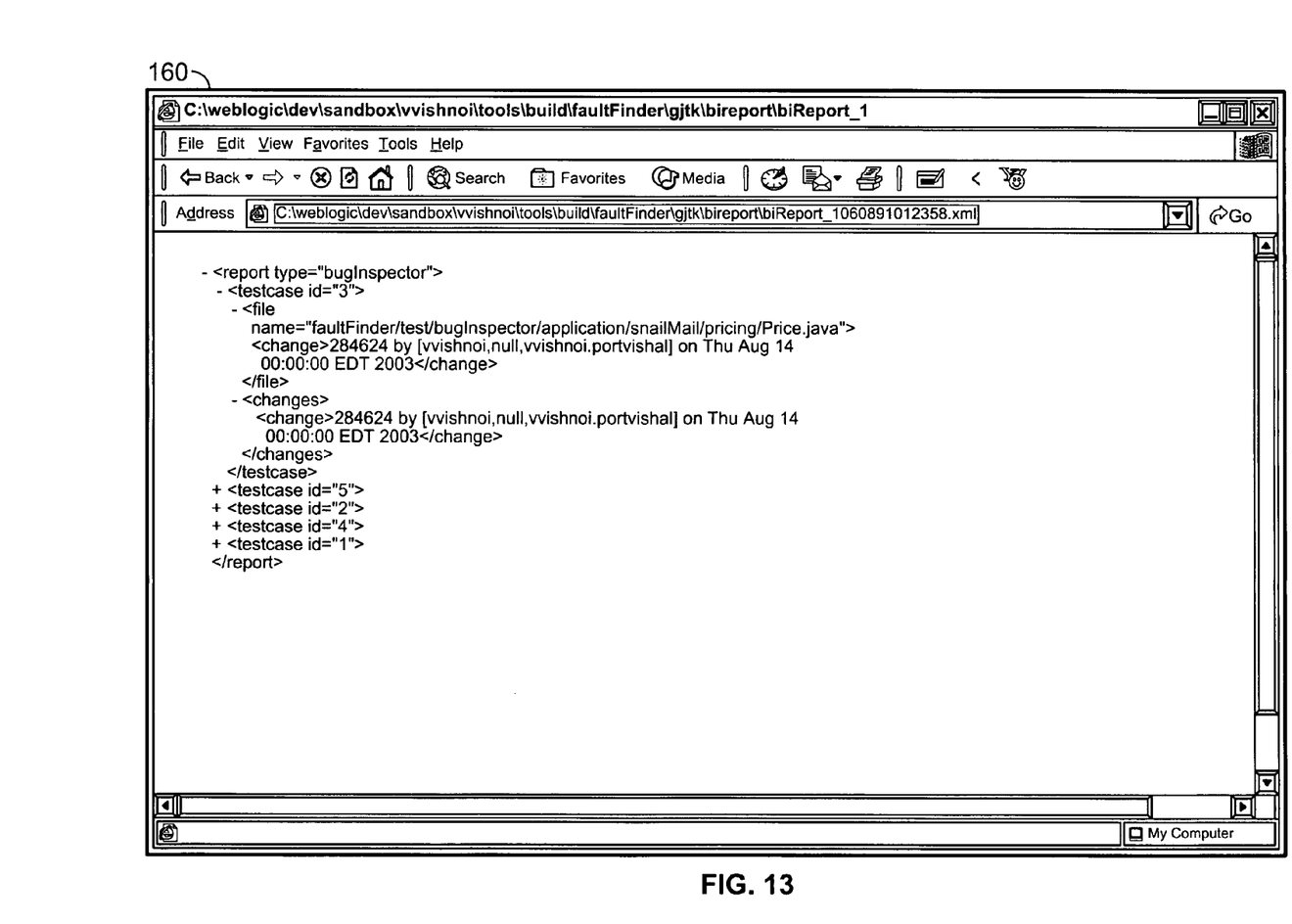
FIG. 13 shows a screenshot of a bug inspection system report in accordance with an embodiment of the invention.

FIG. 13 shows a screenshot of a bug inspection system report in accordance with an embodiment of the invention. FIG. 13 shows the BugInspector report that's generated at time t4, and illustrates that out of the 50 changes given to BugInspector (from −284600, to −284650), it found only one suspect change, 284624, that caused the 'tesprice' test to fail. Thus, BugInspector correctly identified the change that introduced the bug. This information can then be used by the QA specialist to fix the errant code.

Figure 14:
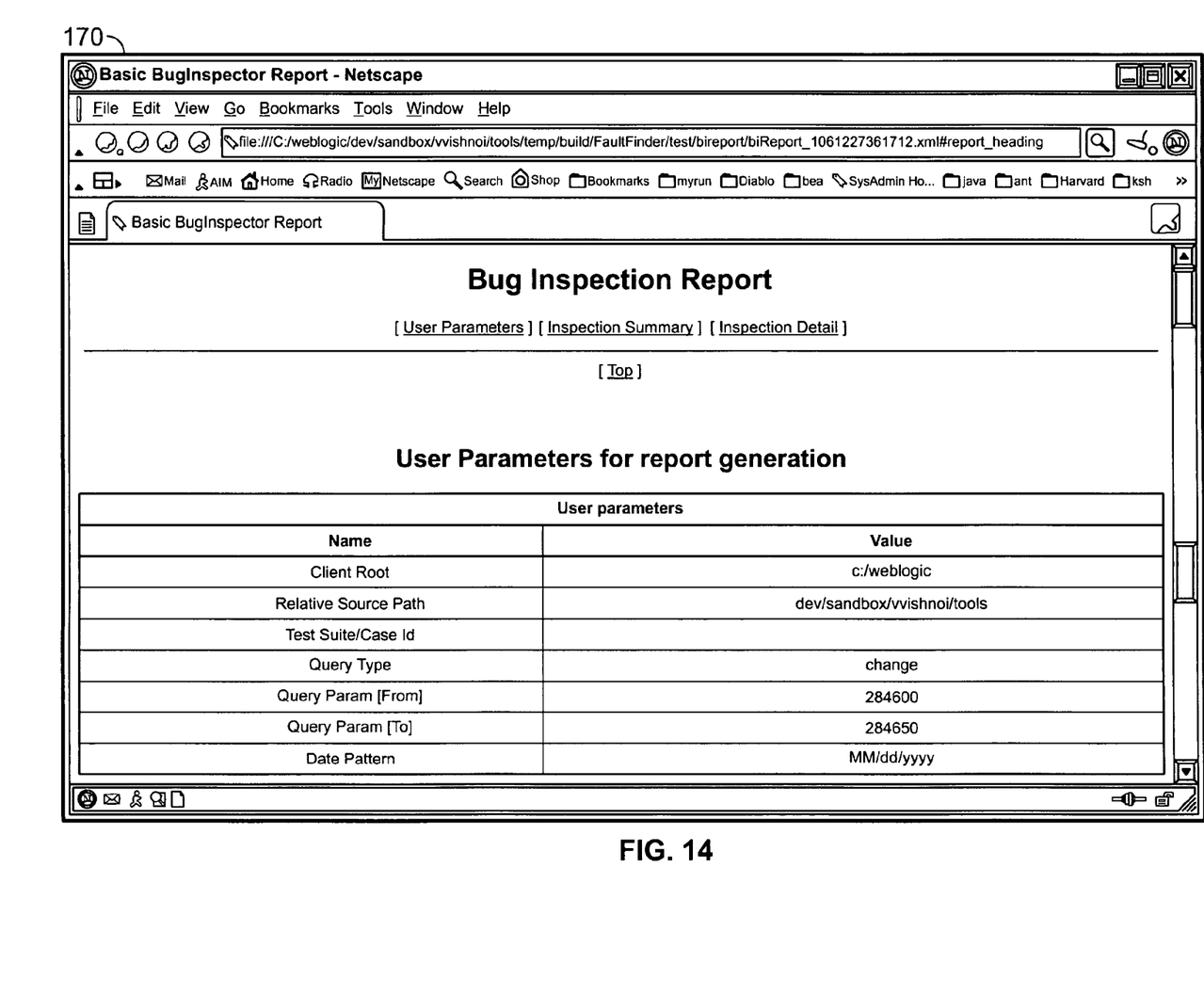
FIG. 14 shows an example of an alternate html bug inspection system report input in accordance with an embodiment of the invention.

FIG. 14 shows an example of an alternate html bug inspection system report input 170 in accordance with an embodiment of the invention.

Figure 15:
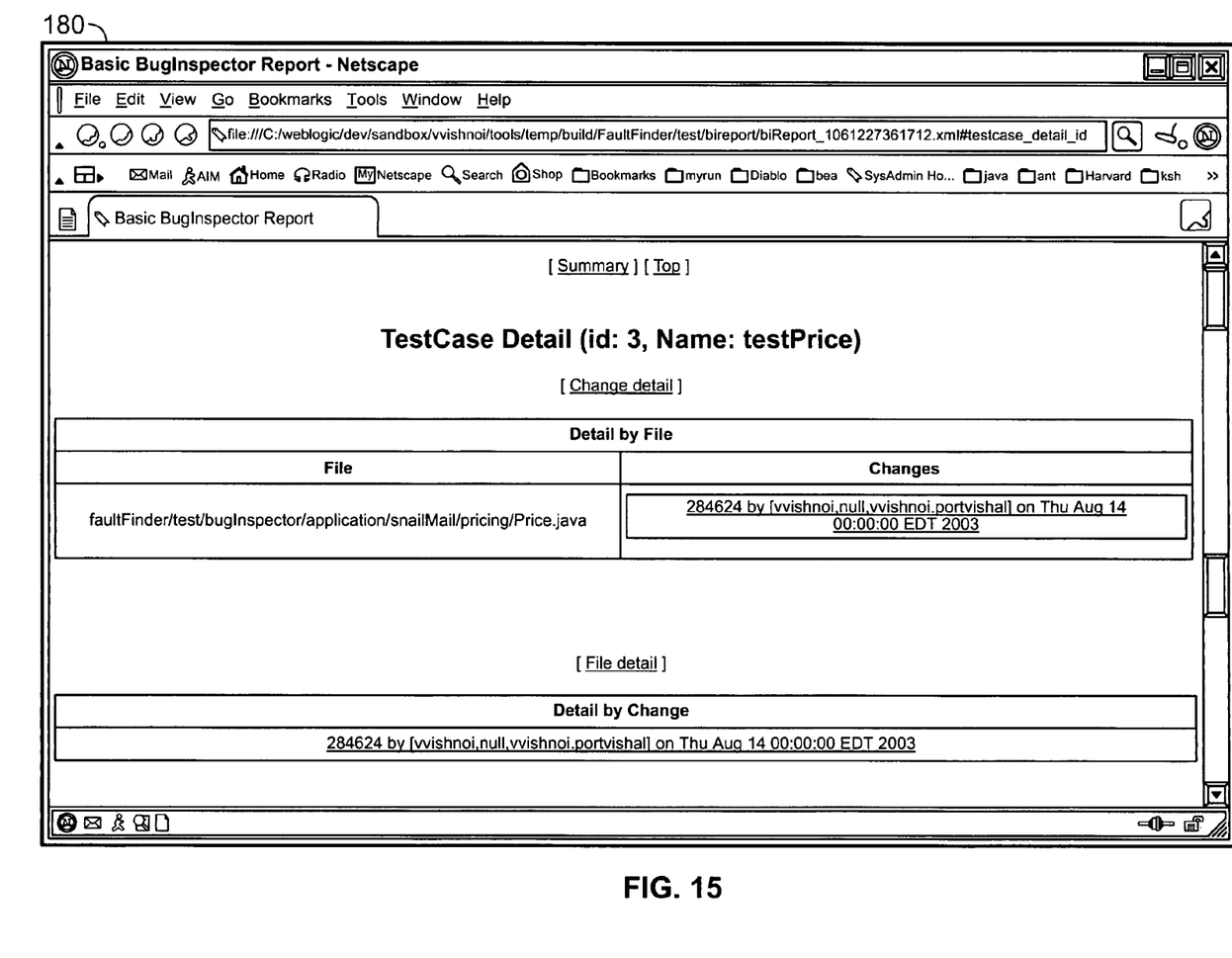
FIG. 15 shows a screenshot of a bug inspection system html report and case detail for a specific change number in accordance with an embodiment of the invention.

FIG. 15 shows a screenshot of a bug inspection system html report and case detail 180 for a specific change number in accordance with an embodiment of the invention.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, while the embodiment of the system is described in combination or use with the Perforce "P4" SCM system, and the GlassJarToolkit CCA system, these and other test tools may or may not themselves be a part of the framework. The above-described details are exemplary and do not preclude extending the framework to support the entire process, thereby abstracting the entire execution and analysis effort from the underlying TER, CCA, and SCM tools, nor do they preclude the use of other types of TER, CCA, and SCM systems. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for software source code analysis, comprising:
a computer including a processor;
a plugin framework that includes a plurality of software interfaces to allow software test tools to be plugged into the system in a tool-agnostic manner;
a software interface to a source code management tool, which can be used to receive information from the source code management tool to identify changes that have been made by developers to source code during a specified interval of time or during a set of relative edit changes, independent of any particular source code management tool implementation;
a software interface to a code coverage tool, which can be used to receive information from the code coverage tool to identify source code that has been exercised by the system during a test run, independent of any particular code coverage tool implementation;

a software interface for identifying which source files are exercised in a software product by a particular software test, using code coverage mapping, a software interface for identifying which tests have failed during a test execution cycle for a particular software product, independent of any particular testing technology or test execution tool; and a bug inspection analyzer that determines a failure-to-change intersection point by integrating the information from the plurality of software interfaces, including both the software interface to the source code management tool and the software interface to the code coverage tool to determine which of the tests failed, which of the source code files of the target software product are exercised by the failing tests as determined by the information received from the code coverage tool, and which of the files identified thereby have been changed by a developer, during the specified interval of time or the specified set of relative edit changes, as determined by the information received from the source code management tool.

2. The system of claim 1 wherein changes to the software code between a first version of the software code and a second version of the software code are identified by change label.

3. The system of claim 1 wherein changes to the software code between said a first version of the software code and a second version of the software code are identified by modification date.

4. The system of claim 1 wherein the code coverage interface includes an input for allowing an operator to specify either of date and/or code change ranges to be analyzed by said bug inspection analyzer.

5. The system of claim 1 wherein the interfaces are realized to interact with a tool-specific implementation that interfaces to a vendor-specific subsystem.

6. The system of claim 1 wherein the source code interface includes an interface to a vendor-specific source code management (SCM) system.

7. The system of claim 6 wherein the system includes said SCM system.

8. The system of claim 1 wherein the system includes an interface to a test execution and reporting (TER) system.

9. The system of claim 8 wherein the system includes said TER system.

10. The system of claim 1 wherein the system includes an interface to a code testing system.

11. The system of claim 10 wherein the system includes said code testing system.

12. A system for software source code analysis, comprising:

a computer including a processor;

a plugin framework that includes a plurality of software interfaces to allow software test tools to be plugged into the system in a tool-agnostic manner;

means for retrieving a software code and running test suites against it at a first time and at a second time;

means for importing code coverage data into the framework for failure analysis to identify source code that has been exercised by the system during a test run;

means for retrieving detailed set of line-level product changes from a source code management system to identify changes that have been made by developers to source code during a specified interval of time or during a set of relative changes; and, means for comparing line-level code coverage data for a test case from a code coverage toolset to line-level change information from a source code management system, and determining an intersection of these two data sets to represents the set of critical changes over the specified interval of time or specified set of relative edit changes, including determining which of the tests failed, which of the source code files of the target software product are exercised by the failing tests as determined by the information received from the code coverage tool, and which of the files identified thereby have been changed by a developer, during the specified interval of time or the specified set of relative changes, as determined by the information received from the source code management tool.

13. A method for software source code analysis performed on a computer, comprising the steps of:

providing a plugin framework that includes a plurality of software interfaces to allow software test tools to be plugged into the framework in a tool-agnostic manner, including a software interface for allowing the plugin of source code management tools and a software interface for allowing the plugin of code coverage tools or databases;

accessing a source code management system that is plugged into the plugin framework, which can be used to identify changes that have occurred to source code over a specified interval of time or relative changes, independent of any particular source code management tool implementation;

accessing a code coverage database that is plugged into the plugin framework, which can be used to identify what source code has been exercised during a test run, independent of any particular code coverage tool implementation;

identifying which source files are exercised in a software product by a particular software test, using code coverage mapping;

identifying what tests have failed during a test execution cycle for a particular software product, independent of any particular testing technology or test execution tool; and determining a failure-to-change intersection point by integrating the information culled from the software interfaces to determine what tests failed, what source code files of the target software product are exercised by the failing tests, and which of the files identified thereby have been changed by a product software developer since the failed tests were last known to be in a passing state or within some other specified interval of time or specified set of relative edit changes.

14. The method of claim 13 wherein changes to the software code between a first version of the software code and a second version of the software code are identified by change label.

15. The method of claim 13 wherein changes to the software code between a first version of the software code and a second version of the software code are identified by modification date.

16. The method of claim 13 wherein the code coverage interface includes an input for allowing an operator to specify either of date and/or code change ranges to be analyzed.

17. The method of claim 13 wherein the interfaces are realized to interact with a tool-specific implementation that interfaces to a vendor-specific subsystem.

18. The method of claim 13 wherein the source code interface includes an interface to a vendor-specific source code management (SCM) system.

19. The method of claim 18 wherein the framework includes said SCM system.

20. The method of claim 13 wherein the framework includes an interface to a test execution and reporting (TER) system.

21. The method of claim 20 wherein the framework includes said TER system.

22. The method of claim 13 wherein the framework includes an interface to a code testing system.

23. The method of claim 22 wherein the framework includes said code testing system.

24. A method of software source code analysis performed on a computer, comprising the steps of:
   providing a plugin framework that includes a plurality of software interfaces to allow software test tools to be plugged into the framework in a tool-agnostic manner, including a software interface for allowing the plugin of source code management tools and a software interface for allowing the plugin of code coverage tools or databases;
   retrieving a software code and running test suites against it at a first time and at a second time;
   importing code coverage data into the framework for failure analysis;
   retrieving detailed set of line-level product changes from a source code management system that is plugged into the plugin framework; and
   comparing line-level code coverage data for a test case from a code coverage toolset that is plugged into the plugin framework to line-level change information from a source code management system, and determining an intersection of these two data sets to represents the set of critical changes over a specified interval of time or specified set of relative edit changes.

25. A computer readable medium including instruction stored thereon which when executed cause the computer to perform the steps of:
   providing a plugin in framework that includes a plurality of software interfaces to allow software test tools to be plugged into the framework in a tool-agnostic manner, including a software interface for allowing the plugin of source code management tools and a software interface for allowing the plugin of code coverage tools or database;
   accessing a source code management system that is plugged into the plugin framework, which can be used to identify changes that have occurred to source code over a specified interval of time or relative changes, independent of any particular source code management tool implementation;
   accessing a code coverage database that is plugged into the plugin framework, which can be used to identify what source code has been exercised during a test run, independent of any particular code coverage tool implementation;
   identifying which source files are exercised in a software product by a particular software test, using code coverage mapping;
   identifying what tests have failed during a test execution cycle for a particular software product, independent of any particular testing technology or test execution tool; and
   determining a failure-to-change intersection point by integrating the information culled from the software interfaces to determine what tests failed, what source code files of the target software product are exercised by the failing tests, and which of the files identified thereby have been changed by a product software developer since the failed tests were last known to be in a passing state or within some other specified interval of time or specified set of relative edit changes.

* * * * *

UNITED STATES PATENT AND TRADEMARK OFFICE
CERTIFICATE OF CORRECTION

| | | |
|---|---|---|
| PATENT NO. | : 7,503,037 B2 | Page 1 of 1 |
| APPLICATION NO. | : 10/816615 | |
| DATED | : March 10, 2009 | |
| INVENTOR(S) | : Banerjee et al. | |

It is certified that error appears in the above-identified patent and that said Letters Patent is hereby corrected as shown below:

In column 2, line 26, after "SCM" insert -- . --.

In column 7, line 2, delete "informaiton" and insert -- information --, therefor.

In column 7, line 53-54, delete "BugInspctor" and insert -- BugInspector --, therefor.

In column 7, line 57, delete "equry" and insert -- query --, therefor.

In column 8, line 2, delete "tesprice" and insert -- testPrice --, therefor.

In column 9, line 30, in claim 3, after "between" delete "said".

In column 12, line 4, in claim 25, after "plugin" delete "in".

In column 12, line 9-10, in claim 25, delete "database;" and insert -- databases; --, therefor.

Signed and Sealed this

Eleventh Day of May, 2010

David J. Kappos
*Director of the United States Patent and Trademark Office*